(12) United States Patent
Khosla et al.

(10) Patent No.: US 8,196,408 B2
(45) Date of Patent: Jun. 12, 2012

(54) SYSTEM AND METHOD FOR DISTRIBUTING FUEL IN A TURBOMACHINE

(75) Inventors: Sachin Khosla, Greenville, SC (US); Neal Spencer Birchfield, Oxford, OH (US); Mark William Pinson, Greer, SC (US)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 12/576,557

(22) Filed: Oct. 9, 2009

(65) Prior Publication Data

US 2011/0083441 A1   Apr. 14, 2011

(51) Int. Cl.
*F02C 1/00* (2006.01)
(52) U.S. Cl. ......................................................... 60/734
(58) Field of Classification Search .................. 60/39.37, 60/734, 739, 740, 742, 746, 752, 804
See application file for complete search history.

(56) References Cited

U.S. PATENT DOCUMENTS

| 4,912,931 | A | 4/1990 | Joshi et al. |
| 5,406,784 | A | 4/1995 | Vertens et al. |
| 5,408,825 | A | 4/1995 | Foss et al. |
| 6,112,971 | A * | 9/2000 | Castaldo et al. .............. 228/126 |
| 7,610,745 | B2 * | 11/2009 | Fujii et al. ..................... 60/39.27 |
| 7,908,863 | B2 * | 3/2011 | Hessler .......................... 60/740 |
| 2006/0010873 | A1 | 1/2006 | Henriquez |
| 2007/0099142 | A1 | 5/2007 | Flohr et al. |
| 2007/0151255 | A1 * | 7/2007 | Johnson et al. ................. 60/776 |
| 2008/0190112 | A1 | 8/2008 | Yoshida et al. |
| 2010/0018210 | A1 * | 1/2010 | Fox et al. ........................ 60/746 |
| 2010/0139279 | A1 * | 6/2010 | Reed et al. ..................... 60/734 |

* cited by examiner

*Primary Examiner* — Louis Casaregola
*Assistant Examiner* — Phutthiwat Wongwian
(74) *Attorney, Agent, or Firm* — Cantor Colburn LLO

(57) ABSTRACT

A turbomachine includes a compressor, a turbine operatively connected to the compressor, and a combustion assembly fluidly connected between the compressor and the turbine. The combustion assembly includes an end cover including a plurality of fuel circuits, a fuel distributing flange fluidly connected to at least one of the plurality of fuel circuits, a nozzle assembly fluidly linked to the at least one of the plurality of fuel circuits, and a fuel distribution system configured and disposed to deliver fuel to the fuel distributing flange. The fuel distribution system is selectively activated to stage fuel delivery to the at least one of the plurality of fuel circuits at a pressure sufficient to achieve atomization at the nozzle assembly without requiring a supplemental atomization air flow prior to delivering fuel to others of the plurality of fuel circuits at a pressure to achieve atomization without requiring a supplemental atomization air flow.

14 Claims, 2 Drawing Sheets

SYSTEM AND METHOD FOR DISTRIBUTING FUEL IN A TURBOMACHINE

BACKGROUND OF THE INVENTION

The subject matter disclosed herein relates to art of turbomachines and, more particularly, to a system and method for distributing fuel in a turbomachine.

Turbomachines typically include a plurality of combustor assemblies that supply fuel to respective combustion chambers. The fuel is supplied to an endcover that includes a plurality of fuel circuits each of which terminate at a fuel nozzle. In the case of liquid fuel, the endcover includes a flange that links each of the plurality of fuel circuits with a fuel source. The flange feeds the liquid fuel to each nozzle. In addition to fuel, water may be supplied to each nozzle through another flange, and a supplemental atomization air supply may be provided to each nozzle from a compressor.

Initially, fuel and water are delivered to the flange for distribution to all of the fuel circuits on a particular endcover. During certain periods, such as start up, the fuel is passed to each fuel circuit at a low pressure. As such, supplemental atomization air, in the form of compressed air, must be added to ensure proper atomization of the fuel at each nozzle. If the fuel is not properly atomized, combustion may not occur. The compressed air is typically extracted from an intermediate stage of an associated compressor. More specifically, the compressed air is withdrawn from a working fluid path, passed to a supplemental compressor that further increases pressure, and delivered to the endcover to atomize the fuel. Withdrawing air from the working fluid path, lowers turbine operating efficiency. In addition to lowering turbine efficiency, the requirement for the supplemental compressor and associated piping to deliver the compressed air to the endcover increases both capital costs and maintenance and operating costs.

BRIEF DESCRIPTION OF THE INVENTION

According to one aspect of the invention, a turbomachine includes a compressor, a turbine operatively connected to the compressor, and a combustion assembly fluidly connected between the compressor and the turbine. The combustion assembly includes an end cover including a plurality of fuel circuits, a fuel distributing flange fluidly connected to at least one of the plurality of fuel circuits, a nozzle assembly fluidly linked to the at least one of the plurality of fuel circuits, and a fuel distribution system configured and disposed to deliver fuel to the fuel distributing flange. The fuel distribution system is selectively activated to stage delivery of fuel to the at least one of the plurality of fuel circuits at a pressure sufficient to achieve atomization at the nozzle assembly without requiring a supplemental atomization air flow prior to delivering fuel to others of the plurality of fuel circuits at a pressure sufficient to achieve atomization at the nozzle assembly without requiring a supplemental atomization air flow.

According to another aspect of the invention, a method of distributing fuel to a plurality of fuel circuits provided in an endcover of a turbomachine combustor assembly includes delivering fuel to a fuel distributing flange fluidly connected to at least one of the plurality of fuel circuits, guiding the fuel from the at least one of the plurality of fuel circuits to a nozzle assembly, and atomizing the fuel at the nozzle assembly without employing a supplemental atomization air flow.

According to yet another aspect of the exemplary embodiment, a turbomachine includes a compressor, a turbine operatively connected to the compressor, a combustion assembly fluidly connected between the compressor and the turbine. The combustion assembly includes an end cover including a plurality of fuel circuits, a fuel distributing flange fluidly connected to at least one of the plurality of fuel circuits, a nozzle assembly fluidly linked to the at least one of the plurality of fuel circuits, and a fuel distribution system configured and disposed to deliver fuel to the fuel distributing flange. The fuel distribution system is selectively activated to stage fuel delivery to the at least one of the plurality of fuel circuits prior to delivering fuel to others of the plurality of fuel circuits.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
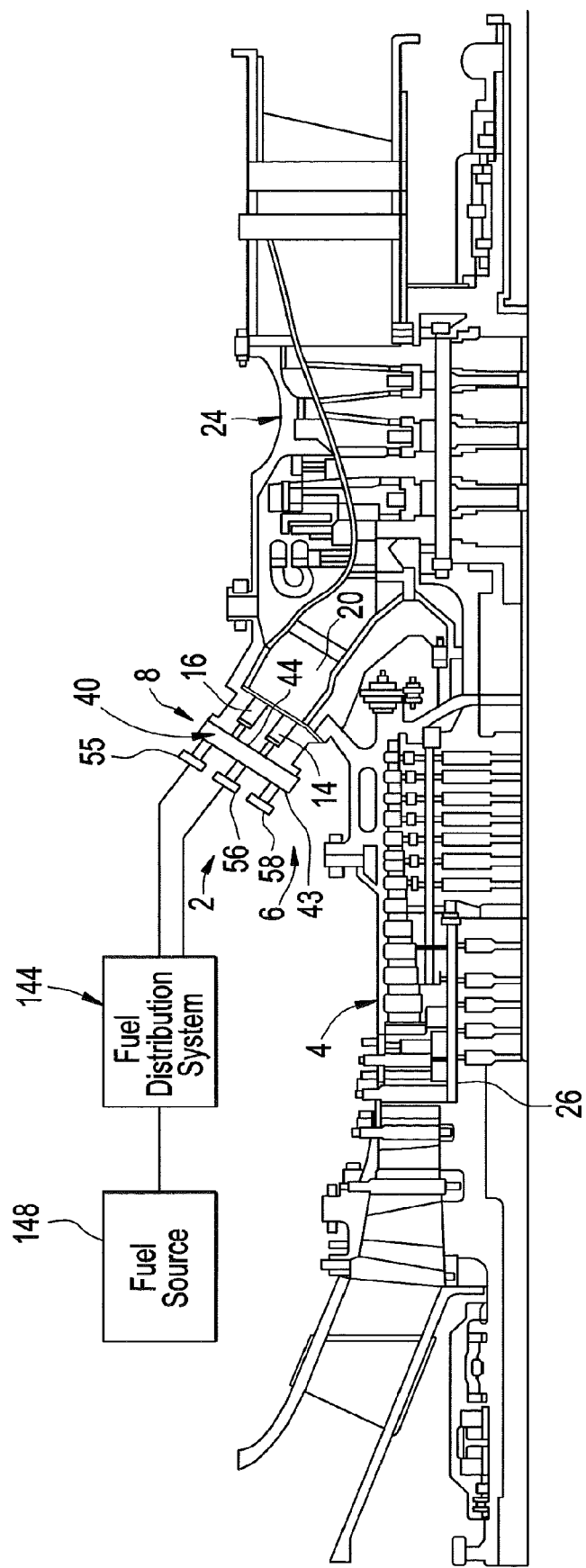
FIG. 1 is a partial cross-sectional side view of a turbomachine including a fuel distribution system in accordance with an exemplary embodiment.

With reference to FIG. 1, a turbomachine constructed in accordance with an exemplary embodiment is indicated generally at 2. Turbomachine 2 includes a compressor 4 and a plurality of circumferentially spaced combustor assemblies, one of which is indicated at 6. Combustor assembly 6 includes an endcover 8 that supports a plurality of combustor nozzle assemblies, two of which are indicated at 14 and 16. As will be discussed more fully below, nozzle assemblies 14 and 16 guide fuel into a combustion chamber 20. The fuel is ignited in combustion chamber 20 forming hot gasses that are channeled toward a turbine 24 As shown, turbine 24 is operatively linked to compressor 4 through a common compressor/turbine shaft or rotor 26.

In operation, air flows into compressor 4 and is compressed. A portion of the compressed air is then supplied to combustor assembly 6. Fuel is channeled to combustion chamber 20 in which the fuel is mixed with air and ignited. Combustion gases are generated and channeled to turbine 24 wherein thermal energy in the hot gases is converted to mechanical rotational energy that drives shaft 26. It should be appreciated that the term "fuel" as used herein includes any medium or material that flows, and is not limited to one type of fuel. Fuel should also be understood to include mixtures of fuel and water or other fluid or mixtures of various fuels.

Figure 2:
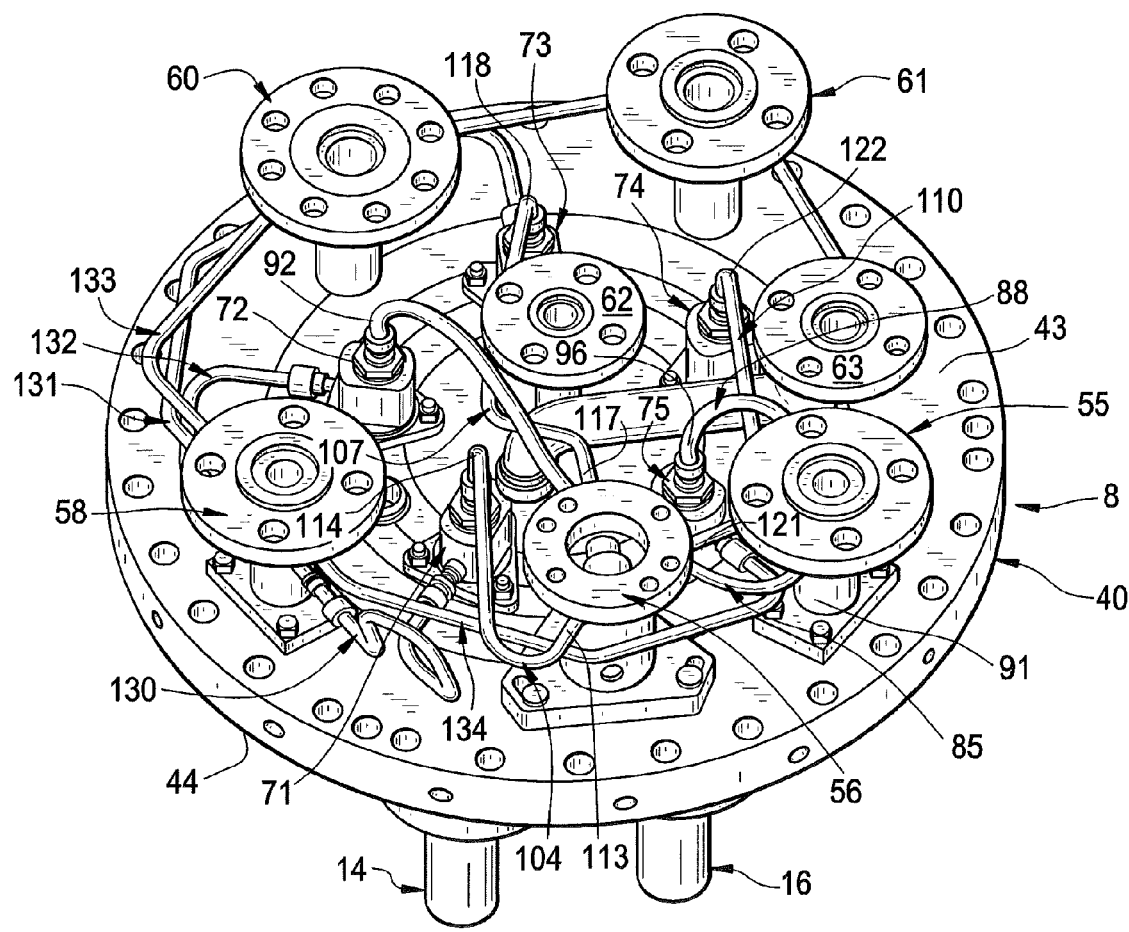
FIG. 2 is a perspective view of an endcover of the turbomachine of FIG. 1.

Reference will now be made to FIG. 2 in describing endcover 8 in accordance with an exemplary embodiment. As shown, endcover 8 includes a body member 40 having a first or outer surface 43 and an opposing second or inner surface 44. Endcover 8 includes a plurality of flanges that serve as inlets to combustor assembly 6. More specifically, endcover 8 includes first and second fuel distributing flanges 55 and 56 that deliver liquid fuel to combustor assembly 6 in a manner that will be detailed more fully below. In addition, endcover 8 includes a third flange 58 that delivers water to combustor assembly 6, as well as various additional flanges 60-63 which deliver other materials such as gas fuel and purge air. Endcover 8 is further shown to include a plurality of inlet members 71-75 that are fluidly linked to the nozzle assemblies associated with combustor assembly 6. More specifically, inlet member 71 is fluidly connected to nozzle assembly 14 while inlet member 75 is fluidly connected to, nozzle 16. Other ones of inlet members 71-75 are connected to additional nozzle assemblies (not shown).

As further shown in FIG. 2, first fuel distributing flange 55 is fluidly connected to inlet member 72 via a first conduit 85 that defines a first fuel circuit (not separately labeled). First fuel distributing flange 55 is also connected to inlet member 75 via a second conduit 88 that defines a second fuel circuit (also not separately labeled). As shown, first conduit 85 includes a first end 91 that extends from first fuel distributing flange 55 to a second end 92 that connects to a top portion of inlet member 72. Similarly, second conduit 88 includes a first end (not shown) that extends from fuel distributing flange 55 to a second end 96 that connects to a top end of inlet member 75. As further shown in FIG. 2, second fuel distributing flange 56 is fluidly connected to fluid member 71 via a third conduit 104 that defines a third fuel circuit, to inlet member 73 via a fourth conduit 107 that defines a fourth fuel circuit, and inlet member 74 via a fifth conduit 110 that defines a fifth fuel circuit.

In a manner similar to that described above, third conduit 104 includes a first end 113 that extends from second fuel distributing flange 56 to a second end 114 that connects to an upper portion of inlet member 71. Fourth conduit 107 includes a first end 117 that extends from second fuel distributing flange 56 to a second end 118 that connects with an upper portion of inlet member 73 while fifth conduit 110 includes a first end 121 that extends from second fuel distributing flange 56 to a second end 122 that connects to an upper portion of inlet member 74. In addition to the five fuel circuits, endcover 8 includes five water circuits 130-134 that fluidly connect third flange 58 with a side portion of each of the plurality of inlet members 71-75. Water circuits 130-134 guide water to each of the plurality of nozzle assemblies carried by endcover 8.

In accordance with an exemplary embodiment, turbomachine 2 includes a fuel distribution system 144 that fluidly connects a fuel source 148 with first and second fuel distributing flanges 55 and 56. Fuel distribution system 144 enables a staged distribution of fuel to each of the five fuel circuits associated with endcover 8. More specifically, during, for example, start-up, fuel is delivered to first fuel distributing flange 55 for delivery to inlet members 72 and 75. By only delivering fuel to inlet members 72 and 75, pressure within first and second conduits 85 and 88 is higher than if fuel was delivered to each of the five fuel circuits. In this manner, fuel passing from the nozzle assemblies associated with first and second inlet members 72 and 75 does not require a supplemental atomization airflow. That is, in accordance with the exemplary embodiment, the fuel flowing through first and second conduits flows at a rate that is above at least 1 lb/sec (0.45 kg/sec). After the fuel passing through the first and second fuel circuits ignites and turbine 2 starts gaining speed, the flow rate to first fuel delivery flange 55 increases to a level between about 1 lb/sec and about 2 lb/sec (0.907 kg/sec).

Once the flow rate of fuel is sufficiently high, additional fuel is delivered to second fuel distribution flange 56 for delivery to the remaining fuel circuits. In this manner, the fuel passing to the remaining fuel circuits is at a flow rate sufficient to cause atomization from the nozzle assemblies without requiring an additional, supplemental atomization airflow. By eliminating the need for supplemental atomization, turbine efficiencies are enhanced. That is, the exemplary embodiment does not require guiding extractions from a downstream portion of turbine 24 back to combustor assembly 6 in order to establish a supplemental atomization airflow. By removing the need for the extraction, more energy is passed turbine 24 enhancing overall turbomachine efficiency. In addition, the turbomachine in accordance with the exemplary embodiment would not require an auxiliary compressor to further compress the supplemental atomization airflow thereby lowering capital costs as well as eliminating various maintenance issues.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbomachine comprising:
   a compressor;
   a turbine operatively connected to the compressor;
   a combustion assembly fluidly connected between the compressor and the turbine, the combustion assembly including:
      a combustor end cover including a plurality of fuel circuits;
      a fuel distributing flange mounted to an outer surface of the combustor endcover and fluidly connected to at least one of the plurality of fuel circuits;
      a nozzle assembly fluidly linked to the at least one of the plurality of fuel circuits;
      another fuel distributing flange fluidly connected to at least one other of the plurality of fuel circuits;
      another nozzle assembly fluidly connected to the at least one other of the plurality of fuel circuits; and
      a fuel distribution system configured and disposed to deliver fuel to the fuel distributing flange, the fuel distribution system being selectively activated to stage fuel delivery to the at least one of the plurality of fuel circuits at a pressure sufficient to achieve atomization without requiring a supplemental atomization air flow at the nozzle assembly prior to delivering fuel to others of the plurality of fuel circuits at a pressure sufficient to achieve atomization without requiring a supplemental atomization air flow at the nozzle.

2. The turbomachine according to claim 1, wherein the fuel distributing system is configured and disposed to direct fuel to the at least one other of the plurality of fuel circuits only when fuel pressure is sufficient to achieve atomization at the another nozzle without requiring a supplemental atomization air flow.

3. The turbomachine according to claim 2, wherein the endcover includes at least five fuel circuits, each of the at least five fuel circuits being fluidly connected to an associated nozzle assembly.

4. The turbomachine according to claim 3, wherein the fuel distributing flange is connected to one of the at least five fuel circuits.

5. The turbomachine according to claim 3, wherein the fuel distributing flange is connected to only two of the plurality of fuel circuits.

6. The turbomachine according to claim 2, wherein the fuel delivery system is configured and disposed to stage delivery of liquid fuel to each of the fuel distributing flange and the another fuel distributing flange.

7. The turbomachine according to claim 6, wherein the fuel delivery system passes fuel to the another fuel distributing flange only after fuel flow at the fuel distributing flange is above at least one lbs/sec (0.45 kg/sec).

8. The turbomachine according to claim 6, wherein the fuel delivery system passes fuel to the another fuel distributing flange only after fuel flow at the fuel distributing flange is between at least one lbs/sec (0.45 kg/sec) and about 2 lbs/sec (0.907 kg/sec).

9. A turbomachine comprising:
   a compressor;
   a turbine operatively connected to the compressor;
   a combustion assembly fluidly connected between the compressor and the turbine, the combustion assembly including:
      a combustor end cover including a plurality of fuel circuits;
      a fuel distributing flange mounted to an outer surface of the combustor endcover and fluidly connected to at least one of the plurality of fuel circuits;
      a nozzle assembly fluidly linked to the at least one of the plurality of fuel circuits;
      another fuel distributing flange fluidly connected to at least one other of the plurality of fuel circuits;
      another nozzle assembly fluidly connected to the at least one other of the plurality of fuel circuits; and
      a fuel distribution system configured and disposed to deliver fuel to the fuel distributing flange, the fuel distribution system being selectively activated to stage fuel delivery to the at least one of the plurality of fuel circuits prior to delivering fuel to others of the plurality of fuel circuits.

10. The turbomachine according to claim 9, wherein wherein the fuel distributing system is configured and disposed to direct fuel to the at least one other of the plurality of fuel circuits only when fuel pressure is sufficient to achieve atomization at the another nozzle without requiring a supplemental atomization air flow.

11. The turbomachine according to claim 10, wherein the endcover includes at least five fuel circuits, each of the at least five fuel circuits being fluidly connected to an associated nozzle assembly.

12. The turbomachine according to claim 11, wherein the fuel distributing flange is connected to one of the at least five fuel circuits.

13. The turbomachine according to claim 11, wherein the fuel distributing flange is connected to only two of the plurality of fuel circuits.

14. The turbomachine according to claim 10, wherein the fuel delivery system is configured and disposed to stage delivery of liquid fuel to each of the fuel distributing flange and the another fuel distributing flange.

* * * * *